US007606890B1

(12) United States Patent
Baier et al.

(10) Patent No.: US 7,606,890 B1
(45) Date of Patent: Oct. 20, 2009

(54) SYSTEM AND METHODOLOGY PROVIDING NAMESPACE AND PROTOCOL MANAGEMENT IN AN INDUSTRIAL CONTROLLER ENVIRONMENT

(75) Inventors: John Joseph Baier, Mentor, OH (US); Douglas Francis McEldowney, Medina, OH (US); David Michael Callaghan, Concord, OH (US); Douglas R. Wylie, Eastlake, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 594 days.

(21) Appl. No.: 10/162,314

(22) Filed: Jun. 4, 2002

(51) Int. Cl.
*G06F 15/173* (2006.01)
*G06F 15/16* (2006.01)

(52) U.S. Cl. .................. 709/224; 709/223; 709/217; 709/219; 709/245

(58) Field of Classification Search ............... 709/224, 709/223, 217, 219, 245
See application file for complete search history.

(56) References Cited

U.S. PATENT DOCUMENTS

| 5,122,948 | A | | 6/1992 | Zapolin |
| 5,611,059 | A | | 3/1997 | Benton et al. |
| 5,710,885 | A | * | 1/1998 | Bondi ........................ 709/224 |
| 5,844,794 | A | | 12/1998 | Keeley |
| 5,845,149 | A | | 12/1998 | Husted et al. |
| 5,978,568 | A | * | 11/1999 | Abraham et al. ............ 709/224 |
| 6,199,068 | B1 | | 3/2001 | Carpenter |
| 6,279,113 | B1 | * | 8/2001 | Vaidya ........................ 726/23 |
| 6,324,607 | B1 | * | 11/2001 | Korowitz et al. ............ 710/300 |
| 6,381,502 | B1 | | 4/2002 | Rudder et al. |
| 6,400,996 | B1 | | 6/2002 | Hoffberg et al. |
| 6,412,032 | B1 | * | 6/2002 | Neet et al. ..................... 710/52 |
| 6,457,024 | B1 | | 9/2002 | Felsentein et al. |
| 6,463,338 | B1 | * | 10/2002 | Neet .......................... 700/17 |
| 6,535,926 | B1 | * | 3/2003 | Esker ........................ 709/248 |
| 6,624,388 | B1 | | 9/2003 | Blankenship et al. |

(Continued)

FOREIGN PATENT DOCUMENTS

WO 0111586 A 2/2001

OTHER PUBLICATIONS

Vasudevan, A Web Services Primer, Apr. 4, 2001, XML.com, http://webservices.xml.com/pub/a/ws/2001/04/04/webservices/index.html.

(Continued)

*Primary Examiner*—Patrice Winder
*Assistant Examiner*—Thomas Duong
(74) *Attorney, Agent, or Firm*—Amin, Turocy & Calvin, LLP

(57) ABSTRACT

The present invention relates to a system and methodology facilitating remote namespace management in an industrial control environment. An industrial control system is provided that includes an industrial controller to communicate with a network such as the Internet. Namespace information relating to network locations of associated control devices are accumulated by the control system and/or a server interacting with the control system. The accumulated namespace data can then be employed to manage automated activities such as determining a network topology or mapping. Accumulated topology information can be utilized to determine a status of the collective entity contributing to the network and facilitating remote management of the entity. Such status can be employed to determine current device information in order to launch a plurality of other automated procedures to located devices in the topology.

27 Claims, 9 Drawing Sheets

U.S. PATENT DOCUMENTS

| | | | |
|---|---|---|---|
| 6,640,145 B2 | 10/2003 | Hoffberg et al. | |
| 6,651,062 B2 * | 11/2003 | Ghannam et al. | 707/10 |
| 6,675,226 B1 * | 1/2004 | Nair et al. | 709/250 |
| 6,691,159 B1 | 2/2004 | Grewal et al. | |
| 6,708,074 B1 | 3/2004 | Chi et al. | |
| 6,714,974 B1 | 3/2004 | Machida | |
| 6,728,262 B1 | 4/2004 | Woram | |
| 6,732,165 B1 * | 5/2004 | Jennings, III | 709/220 |
| 6,732,191 B1 | 5/2004 | Baker et al. | |
| 6,819,960 B1 * | 11/2004 | McKelvey et al. | 700/17 |
| 6,891,850 B1 * | 5/2005 | Vandesteeg et al. | 370/466 |
| 6,895,532 B2 | 5/2005 | Raynham | |
| 6,904,600 B1 * | 6/2005 | James et al. | 719/328 |
| 6,907,302 B2 | 6/2005 | Karbassi | |
| 6,965,802 B2 | 11/2005 | Sexton | |
| 6,970,913 B1 * | 11/2005 | Albert et al. | 709/217 |
| 6,982,953 B1 * | 1/2006 | Swales | 370/218 |
| 7,032,045 B2 * | 4/2006 | Kostadinov | 710/105 |
| 7,085,814 B1 * | 8/2006 | Gandhi et al. | 709/208 |
| 7,103,428 B2 | 9/2006 | Varone et al. | |
| 7,133,900 B1 | 11/2006 | Szeto | |
| 7,210,095 B1 * | 4/2007 | Mor | 715/513 |
| 7,277,865 B1 | 10/2007 | Silverstone et al. | |
| 7,289,994 B2 | 10/2007 | Nixon et al. | |
| 7,310,344 B1 | 12/2007 | Sue | |
| 2002/0004796 A1 | 1/2002 | Babula et al. | |
| 2002/0046239 A1 | 4/2002 | Stawikowski et al. | |
| 2002/0065898 A1 * | 5/2002 | Leontiev et al. | 709/208 |
| 2002/0068983 A1 | 6/2002 | Sexton | |
| 2002/0073236 A1 | 6/2002 | Helgeron et al. | |
| 2002/0107904 A1 | 8/2002 | Talluri et al. | |
| 2002/0156872 A1 | 10/2002 | Brown | |
| 2002/0156926 A1 | 10/2002 | Batka | |
| 2002/0161745 A1 | 10/2002 | Call | |
| 2003/0009253 A1 | 1/2003 | McIntyre et al. | |
| 2003/0009572 A1 * | 1/2003 | Thurner | 709/230 |
| 2003/0051074 A1 | 3/2003 | Edwards | |
| 2003/0056224 A1 * | 3/2003 | Stone | 725/112 |
| 2003/0177169 A1 * | 9/2003 | Nutt et al. | 709/201 |
| 2003/0208545 A1 | 11/2003 | Eaton et al. | |
| 2004/0214566 A1 | 10/2004 | Suzuki et al. | |
| 2004/0267729 A1 | 12/2004 | Swaminathan et al. | |
| 2005/0038528 A1 | 2/2005 | McKlvey et al. | |
| 2005/0055429 A1 | 3/2005 | Abele | |
| 2005/0080799 A1 | 4/2005 | Harden et al. | |
| 2005/0125441 A1 | 6/2005 | Clemens et al. | |
| 2006/0173873 A1 | 8/2006 | Prompt et al. | |

OTHER PUBLICATIONS

European Search Report dated Mar. 18, 2004 for European Patent Application Serial No. 03026339, 3 Pages.

Compuquest, Inc., SPM-IM-Instant Messaging Client for SpreadMsg Wireless Messaging Software, http://www.compuquestinc.com/spmim.html.

Compuquest, Inc., SpreadMsg Lite—Data Capture, Scanning, Extraction & Rule Based Instant Messaging Software, http://web.archive.org/web/20020813080848/http://www.compuquestinc.com/spmsgl.html.

International Business Machines Corporation, Cross platform instant messaging using web services, Research Disclosure, Kenneth Mason Publications, Hampshire, GB, vol. 458, No. 156, Jun. 2002.

W3C, Web Services Description Language, http://www.w3.org/TR/wsd1.

* cited by examiner

SYSTEM AND METHODOLOGY PROVIDING NAMESPACE AND PROTOCOL MANAGEMENT IN AN INDUSTRIAL CONTROLLER ENVIRONMENT

TECHNICAL FIELD

The present invention relates generally to industrial control systems, and more particularly to a system and methodology to facilitate automated management of network namespaces in a networked industrial controller system.

BACKGROUND OF THE INVENTION

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off), as well as analog inputs and outputs assuming a continuous range of values. Control programs may be executed in a series of execution cycles with batch processing capabilities.

Measured inputs received from such systems and the outputs transmitted by the systems generally pass through one or more input/output (I/O) modules. These I/O modules serve as an electrical interface to the controller and may be located proximate or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements by receiving an output from the I/O table to control a device such as a motor, valve, solenoid, amplifier, and the like.

Various control modules of the industrial controller may be spatially distributed along a common communication link in several racks. Certain I/O modules may thus be located in close proximity to a portion of the control equipment, and away from the remainder of the controller. Data is communicated with these remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth) TCP/IP, EtherNet/IP, ControlNet®, DeviceNet® or other network protocols (Foundation Fieldbus (H1 and Fast Ethernet) Modbus TCP, Profibus) and also communicate to higher level computing systems. Industrial controllers utilize the aforementioned technologies along with other technology to control multiple applications ranging from complex and highly distributed to more traditional and repetitious applications.

At the core of the industrial control system, is a logic processor such as a Programmable Logic Controller (PLC) or PC-based controller. Programmable Logic Controllers for instance, are programmed by systems designers to operate manufacturing process via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

Modern control systems are increasingly being adapted to communicate over such networks as the Internet and/or other public or private networks. As such, managing a plurality of control systems and related network devices that communicate over such networks has become ever more time consuming and complicated given a plurality of various device addresses and/or locations in which to communicate.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to provide an automated discovery and generation framework for network devices to facilitate namespace/protocol management within an industrial controller environment. An aggregation component is provided within a controller or network server that can automatically retrieve or collect Universal Resource Locator (URL) data (or other address information) across a network such as the Internet to determine device information for devices contributing to the controller environment. This type information can be employed to launch further automated events that affect the devices such as invoking an automated maintenance and/or upgrade procedure within the controller environment. In addition, reporting, broadcasting and/or polling requests can be sent to/from the devices in accordance with predetermined lists, protocols and/or an automated discovery or registration procedures in order to receive device responses indicative of a location, address, service, interface, and/or configuration.

A discovery component can be employed to provide URL information relating to potential network devices that cooperate in the control environment before a broadcast/polling action is initiated to the devices, if desired. Moreover, automated and dynamic URL generation procedures can be provided in accordance with a predetermined convention, whereby a subset of remote network devices perform an automated procedure to generate URLs or network protocols that also have an association with one or more other members of the subset. Furthermore, automated procedures for generating a URL can include dynamic generation techniques based upon location/address information of a network device. As one example, this can include automatically determining and adding location indicia to the URL (e.g., automatically determining a location or address for a device and changing an associated URL such as changing my-company.com to node1.my-company.com). After addresses have been generated, namespace information can be accumulated via a plurality of techniques. For example, devices can auto-report or register a generated address with the aggregation component, auto-report or list the generated address with a discovery component such as a namespace server or Universal Discovery and Description and Integration (UDDI) component, wherein the listing is then read by the aggregation component to determine the address, and can include such techniques as subscribing to a multicast address, wherein network devices that utilize the multicast address are informed of other network devices. In addition, polling and/or broadcasting can occur within a predetermined range of potential addresses or devices that may contribute to a network topology.

In accordance with one aspect of the present invention, a communications component is provided to facilitate remote access to the controller, server and/or aggregation component. The communications component can include several modes for sending/receiving remote URL (or URI) data and/or protocol data such as polling modes, broadcast modes—including one-shot and continuous data broadcasts, and request/reply modes whereby URL data is transmitted in response to a remote URL request. Communications modalities can include web service/client functionality for Internet communications, e-mail functionality for intermittent or one-time broadcasts, and/or other types of communications such as dial-in services for sending/receiving data from the network. One or more XML schemas can be transmitted and received by the communications component in order to accumulate URL information and facilitate discovery of network devices (according to various protocols) interacting with the controller and associated system. The schemas can be adapted with standard protocols and interfaces such as Simple Object Access Protocol (SOAP), and Web Service Description Language (WSDL), wherein the schemas can be defined as a URL report and/or a URL request in order to communicate the URL data.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology facilitating remote namespace and protocol management in an industrial control environment. An industrial control system is provided that includes an industrial controller (e.g. PLC, PC-based controller or equivalent) to communicate with a network such as the Internet. Namespace information relating to network locations of associated control devices are accumulated by the control system and/or a server interacting with the control system (e.g., accumulating device URLs associated with an entity). The accumulated namespace data can then be employed to manage automated activities such as determining a network topology or mapping. Accumulated topology information can be utilized to determine a status of the collective entity contributing to the network and facilitating remote management of the entity. Such status can be employed to determine current device revision or protocols, for example, in order to launch automated procedures such as transmitting firmware and electronic information to the located devices in the topology or changing communications capabilities such as dynamically selecting from a list of predetermined network protocols and adapting communications to a different protocol based upon a network command. The aggregated namespace/topology information can also be employed by systems to provide users with a convenient list of available control devices and/or functions that can be performed on the respective devices.

In addition to self-discovery and/or automatic namespace generation capabilities, the present invention supports auto-configuration options based upon selecting a protocol in accordance with a TCP/IP packet (or other protocol) information. Once configured (e.g., via network command), a remote device employs the protocol until power is cycled to the device and another TCP/IP packet redefines a default protocol. The configured protocols can support multiple industrial Ethernet protocols (e.g., EtherNet/IP, Modbus/TCP, FOUNDATION Fieldbus HSE, TCP, IDA, and so forth). As an example, a Modbus/TCP protocol can be employed for messaging and EtherNet/IP employed to control I/O to the same device.

In addition, a remote device can accept and react to different protocol packets concurrently. This can include executing multiple protocol stacks (e.g., Modbus/TCP, TCP, EtherNet/IP). As an example, a communications component can route an incoming TCP/IP message to suitable stack based on packet's content. Rather than a one-shot configuration of the remote device to a single protocol stack, the present invention can determine which protocol stack a message should be passed or routed through. This type arrangement mitigates the need for a power-cycle to the remote device to select the protocol a message should employ.

Figure 1:
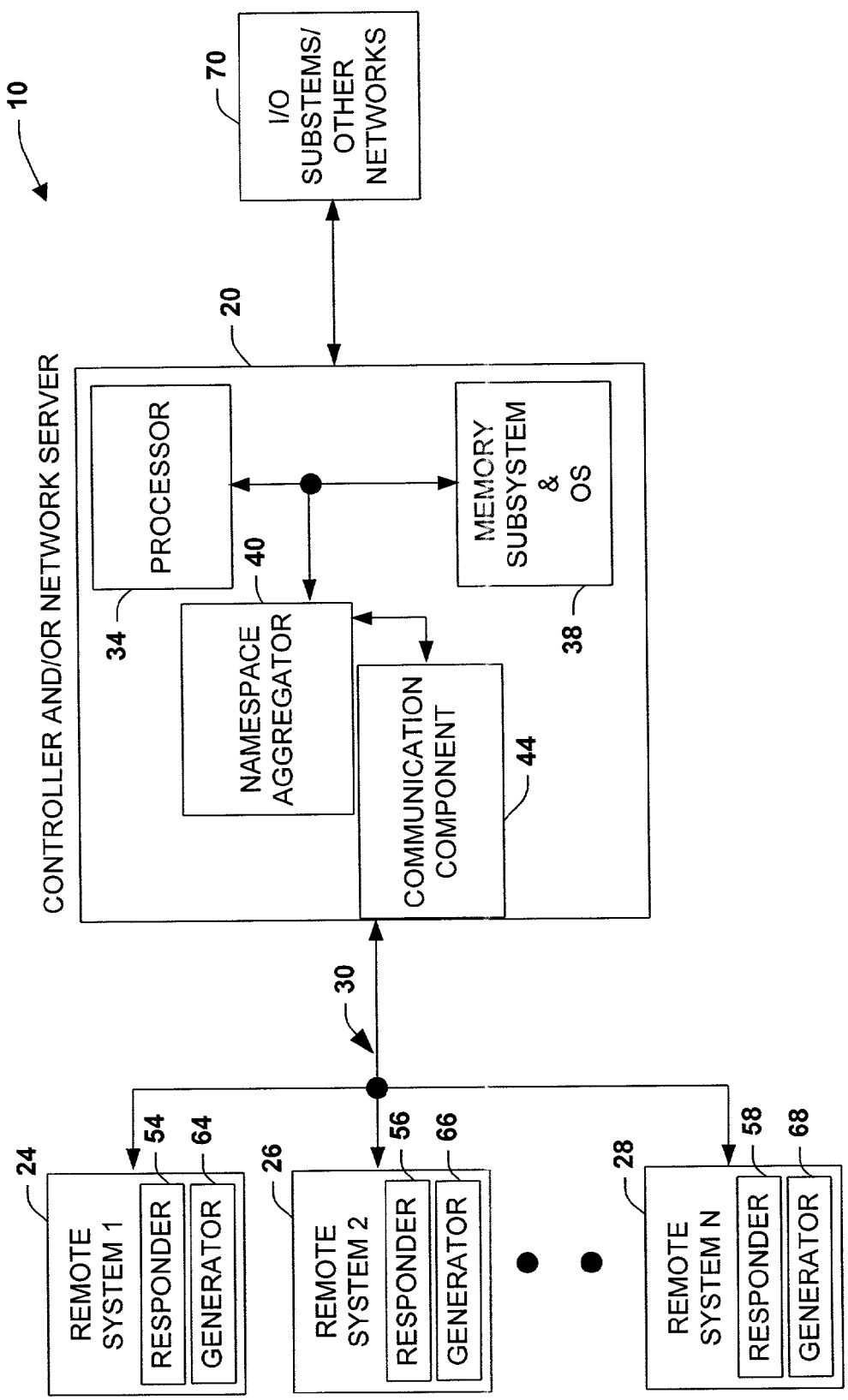
FIG. 1 is a schematic block diagram illustrating an industrial controller and namespace architecture in accordance with an aspect of the present invention.

Referring initially to FIG. 1, an industrial control and namespace management system 10 is illustrated in accordance with an aspect of the present invention. The system 10 includes an industrial controller 20 (or network server interacting with the system) communicating to one or more remote systems 24-28 across a local factory (e.g., Local Area Network, router, gateway, and/or Wireless Network) and/or a public network 30 such as the Internet. This can also include other communications options such as phone connections and/or wireless connections. A processor 34 (or processors) in the controller 20 executes from an associated memory subsystem 38 that can include an operating system (e.g., Windows, NT, Linux, NET, OS-9, UNIX, VRTX, VxWorks, CE.Net, custom-designed).

A namespace aggregator 40 interacts with a communications component 44 and the processor 34 to facilitate remote namespace management. As an example, remote system at 24 can reside as an Internet location having an associated Universal Resource Locator (URL), or other type address. A responder 54 can be polled, respond to a broadcast, and/or automatically report URL data via the communications component 44 in order to provide URL or namespace data to the namespace aggregator 40. Other network devices 26, 28 can similarly provide such data via responders 56 and 58. As namespace data is received from the remote systems 24-28, the namespace aggregator 40 stores/collects the data which then forms a topology of namespace information for the devices interacted therewith. Other processes for retrieving namespace information include automated registration and/or discovery aspects that are described in more detail below.

In another aspect, the namespace aggregator 40 initiates a broadcast request to the remote systems 24-28 via the communications component 44. The broadcast request can be sent in accordance with a predetermined protocol (e.g., to a predetermined address range, wherein if any of the remote systems 24-28 are adapted to respond, URL information is transmitted as a response to the broadcast via responders 56-58 and subsequently collected by the aggregator 40. After URL information is collated, thus defining the network topology, automated procedures can be invoked in accordance with the topology to facilitate namespace management activities. As will be described in more detail below, a discovery component can also be employed that includes network device information retrievable by the namespace aggregator 40.

In another aspect of the present invention, the remote systems 24-28 can include generator components 64-68 automatically generate and/or dynamically adjust URL information relating thereto. For example, URLs can be automatically generated in accordance with an associated MAC ID address, serial/model number, Globally Unique Identifier (GUID) which are unique, wherein a respective communications card or processor on the remote systems determines the address and configures a URL based thereon. Dynamic adjustments can include adding location/address information to a pre-existing URL and/or generating a unique URL based upon the location or other criteria. For example a unique base URL (e.g., http: my-company) may be stored on the remote systems 24-28 and/or controller 20. Upon power up or other time, the generators 64-68 determine location information (e.g., determined from website providing location or name data after generating temporary MAC ID-based URL to retrieve such information). After the location information is determined, the unique base URL is modified to indicate the location or other indicia (e.g., http: ohio.my-company, pulpplant.server.my-company). In yet another aspect, the generators 64-68 can be configured to report generated URL data to a discovery component that is then employed to retrieve the URL information of devices reporting thereto. It is noted that although not shown in FIG. 1, the controller 20 (or network server) can be similarly adapted with a respective responder and generator.

The communications component 44 can be configured in one or more possible communications modalities such as a web server/client, e-mail server/client, voice mail server/client, wireless server/client and dial-in server/client, for example, wherein the modalities can be adapted in one or more possible modes such as polling modes, broadcasting modes, and/or request/reply modes in order to retrieve namespace information and/or respond to namespace requests. The namespace information can be requested and responded to via URL request and reply schemas that are described in more detail below. Although not shown in FIG. 1, the remote systems 24-28 can have similar communications capabilities as the controller 20. It is also noted that the controller 20 can communicate to various Input/Output subsystems 70 and/or other networks to control portions of a distributed manufacturing process (e.g., Analog, Digital, Programmed and/or Intelligent I/O modules, other programmable controllers, communications modules, networks).

Figure 2:
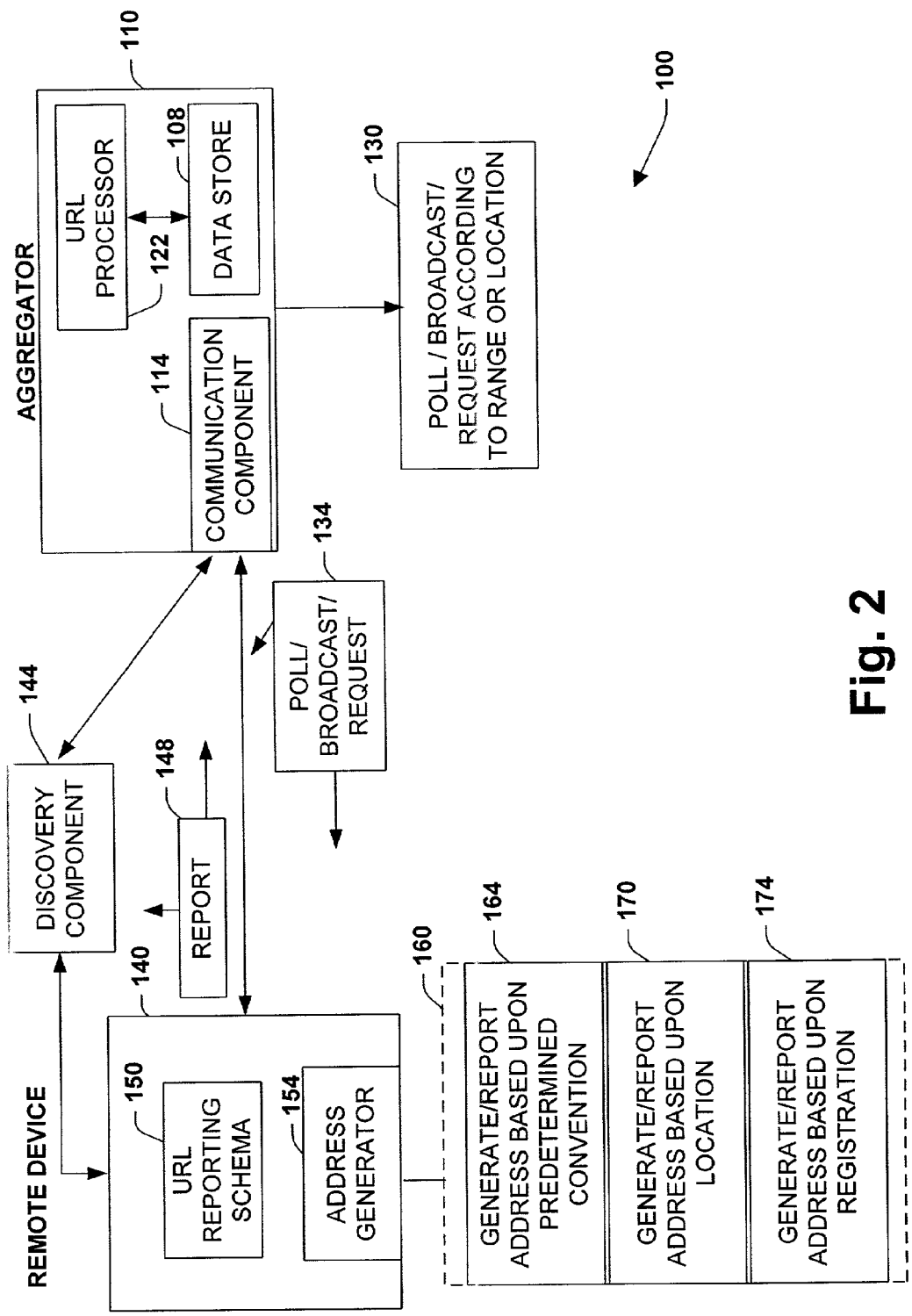
FIG. 2 is a schematic block diagram and associated process diagram illustrating address generation and reporting in accordance with an aspect of the present invention.
Figure 3:
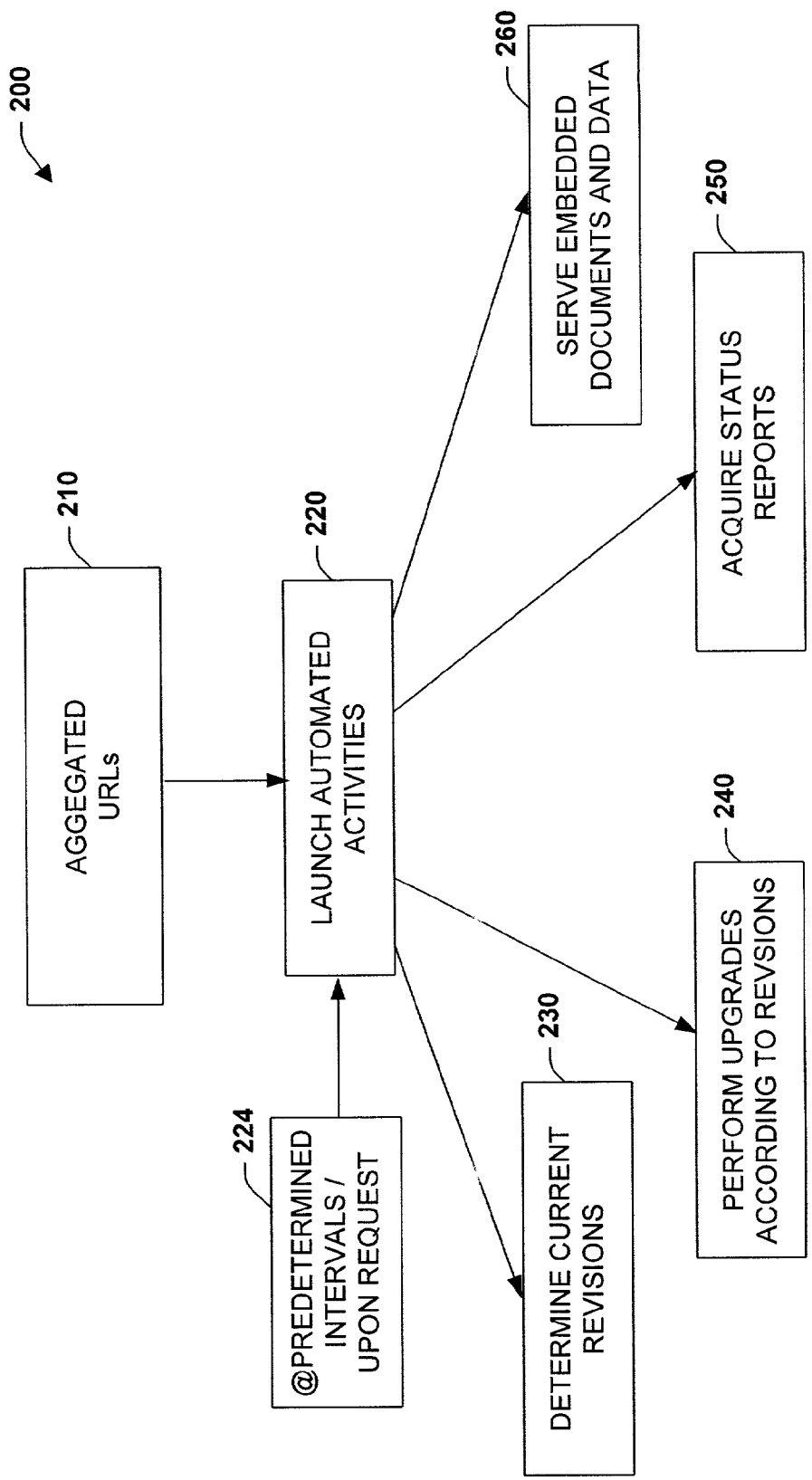
FIG. 3 is a diagram illustrating aggregated URLs launching automated action in accordance with an aspect of the present invention.

FIGS. 2 and 3 illustrate address generation/reporting systems and methodologies in accordance with the present invention. While, for purposes of simplicity of explanation, the methodologies may be shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 2, an address generation, reporting and aggregation system and process 100 is illustrated in accordance with an aspect of the present invention. An aggregator 110 includes a communications component 114 to communicate with a network, a data store 118 to accumulate URL data or address information, and a URL processor 122 to generate and/or receive URL requests and reports. The aggregator 110 can employ polling, broadcast, and/or multicast techniques to a single address and/or range of addresses at 130. A network request is illustrated at 134 which can be transmitted to a remote device 140 and/or discovery component 144 in order to receive a report 148 from the polled, broadcast or multicast device 140. In addition, the discovery component 144 can be polled to query URL information, wherein the information from the device 140 or component 144 is then collated in the data store 118. The remote device 140 can generate a URL reporting schema at 150 in order to generate the report 148 which can include a data packet indicating address or URL information.

In another aspect of the present invention, the remote device can auto-generate and/or auto-report an address in accordance with an address generator 154 and one or more procedures at 160. As one possible addresses generation technique, the address generator 154 upon power-up, generates a unique address such as GUID at 164 and transmits the address to the discovery component 144 and/or to the aggregator 110 via the report 148. The transmission can be based upon a predetermined base address such as to a home/base web site or URL. For example, upon power-up, the address generator 154 can generate a GUID and transmit the GUID to a base address my-company.com, for example, wherein the GUID is then collected at the data store 108 of the associated site.

In another aspect at 170, the GUID generated at 164 is employed for temporary basis to determine location information. This can include polling a remote or local device for an address or location specifier, and then applying the address to a predetermined base address. For example, in the my-company.com base address given above, the determined location at 170 can be added to the base URL of my-company.com to form a unique address. As one example, a GUID is generated, a local or remote device is polled to determine location information (e.g., GPS information), when the location is determined the location is included with the base address to form a location-based address at 170 (e.g., adding cleveland-node to form cleveland-node/my-company.com).

In another aspect of the present invention, a registration procedure can be performed at 174. This can include again employing the GUID generated at 164 as a temporary address. The GUID can then be employed to generate the report 148. When the report is received by the aggregator 110, the aggregator then assigns a new name or network address via a registration reply (not shown) sent to the remote device 140. The address contained in the registration reply is then employed in place of the temporary address generated above by the remote system 140.

Turning now to FIG. 3, an automated activity launch system and process 200 is illustrated in accordance with an aspect of the present invention. The URLs or addresses that were aggregated above are illustrated at 210. A launching component then directs automated activities at 220 based upon the aggregated data. It is to be appreciated that the launching component 220 can include one or more software elements or functional blocks that direct processing execution or operations to perform the associated automated activity. These activities can be launched at predetermined intervals and/or upon a remote system request at 224. The automated activities can include determining current revision information at 230 (e.g., polling or querying the aggregated nodes) from respective node addresses that were aggregated at 210. At 240, automated upgrade procedures can be run to respective nodes that are not currently at the most recent revision as indicated at 230. The upgrade procedures can be operated in accordance with an upgrade schema that is described in more detail below. At 250, status can be retrieved on a periodic basis from the aggregated nodes. This can include diagnostic information and/or other data that can be included as part of a report schema from the respective aggregated nodes. At 260, automated activities can include documentation updates, data updates, file updates and/or firmware updates and can also be specified by or in the upgrade schema.

Figure 4:
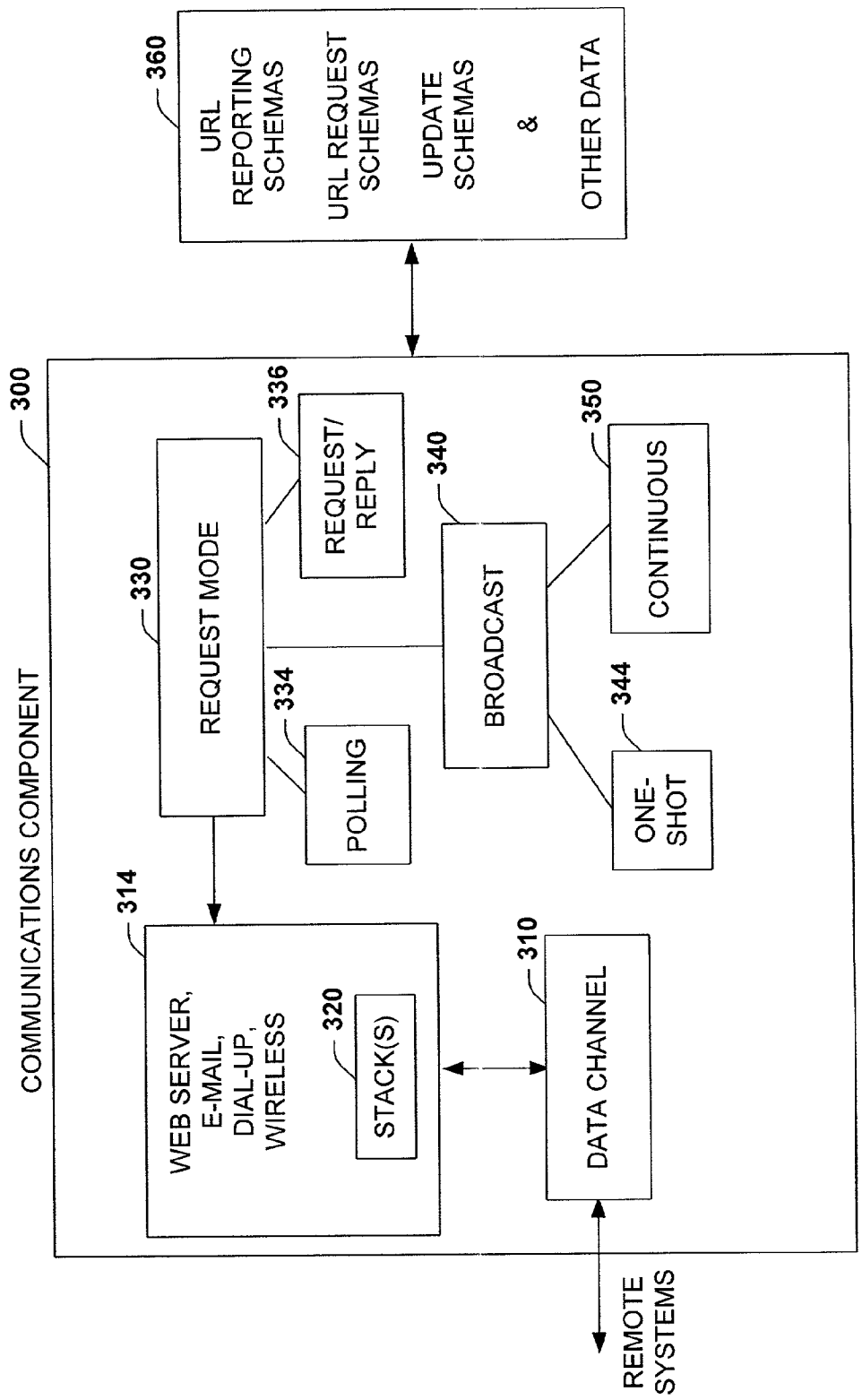
FIG. 4 is a schematic block diagram illustrating a communications component in accordance with an aspect of the present invention.

Referring to FIG. 4, a communications component 300 is illustrated in accordance with an aspect of the present invention. A data channel 310 (or data channels) can be configured to communicate with remote systems via a communications processor 314. As illustrated, the communications processor 314 can be configured or adapted for a plurality of various communications options or combinations thereof such as a web server/client, e-mail server/client, dial-up server/client, wireless access server/client, and so forth, wherein respective server components can send information to and receive information from multiple remote systems. The data channel 310 can include at least one standard socket (e.g., HTTP) for web communications and/or other type sockets (e.g., Secure Socket Layer SSL Socket) to exchange information with remote systems. For example, the standard socket can be an HTTP socket, an FTP socket, a TELNET socket, and/or other network socket.

The communications processor 314 includes a socket interface (not shown) that directs/translates industrial controller communication protocols to/from TCP/IP (or other protocol) and is instantiated by a stack 320. For example, a socket instance, which may be invoked from a remote browser and/or other application, includes information about a controller such as an IP address and port address. The stack 320 presents a layered communications interface to networks such as the Internet and may interface to one or more drivers to communicate with remote systems. One possible driver is a point-to-point (PPP) driver (not shown) for communicating over a phone line. Another possible driver is an Ethernet driver (not shown) that communicates through a Local Area Network (LAN) to remote systems. It is to be appreciated that a plurality of other drivers and network interfaces are possible. It is noted that the stack 320 can include multiple protocol stacks that execute concurrently to process multiple network protocols. For example, other stacks (not shown) can be provided that support such protocols as Modbus/TCP, Profibus, ProfiNet, FOUNDATION Fieldbus HSE, IAD and EtherNet/IP. The data channel 310 can be adapted to filter the various protocols and pass protocols to an associated stack for communications processing of the respective protocol.

The stack 320 (e.g., TCP/IP stack) may be associated with one or more other network layers. A physical layer may be provided that defines the physical characteristics such as electrical properties of a network interface. A data-link layer defines rules for sending information across a physical connection between systems. The stack 320 may include a network layer, which may include Internet protocol (IP) that defines a protocol for opening and maintaining a path on the network. A transport layer associated with the stack 320 may include Transmission Control Protocol (TCP) that provides a higher level of control for moving information between systems. This may include more sophisticated error handling, prioritization, and security features. A session layer, presentation layer, and application layer may also be optionally included that sit above the stack 320.

A request mode component 330 can be employed to direct one or more communications aspects in the communications processor 314. This can include providing configuration information (e.g., flags, parameters) that determine how the communications processor 314 requests from and/or responds to remote systems. The configuration information can include mode settings such as a polling mode 334, a request/reply mode 336, and/or a broadcast mode 340 which are selected based upon user configuration and/or based upon an associated event. The polling mode 334 is generally provided as a one-time request for a block or a contiguous block of URL or other type data (e.g., poll predetermined URL range).

The request/reply mode 336 relates to more immediate interactions with a controller system. This can include going online with a controller or communications module and serving various web or interface pages or schemas to generate URL data from remote systems. As an example, remote systems may dial-in to a server address which serves as an initial request for URL data (e.g., request an assigned URL name from central server), wherein the reply to the remote request is to transmit data relating to the request. As further items are selected from the home page or other areas, data can be served in response to the selected items (e.g., drilling down to other pages or URLs and serving data in response to the selected page/URL).

The broadcast mode 340 is generally provided as an immediate, out-going transmission to devices operative in the control system. Such broadcast can include Local Area Network broadcasts to cause devices communicating thereon to report URL or network address information and/or can include multicast broadcasts that cause devices associated with a multicast address to report network information. Network data can also be transmitted in a one-shot mode 344 such as an e-mail transmission, voice-mail transmission (e.g., predetermined stored message/address or automatically generated URL update message relating to request), one-time network broadcast or multicast. In another aspect, a continuous mode broadcast 350 can be initiated, wherein URL requests are polled, broadcast, and/or multicast in accordance with a regular time interval (e.g., broadcast URL device address requests every two seconds). As will be described in more detail below in relation to FIGS. 6-8, one or more schemas 360 can be employed to interface and exchange data with the communications component 300 in accordance with received URL responses and/or request mode 330.

Figure 5:
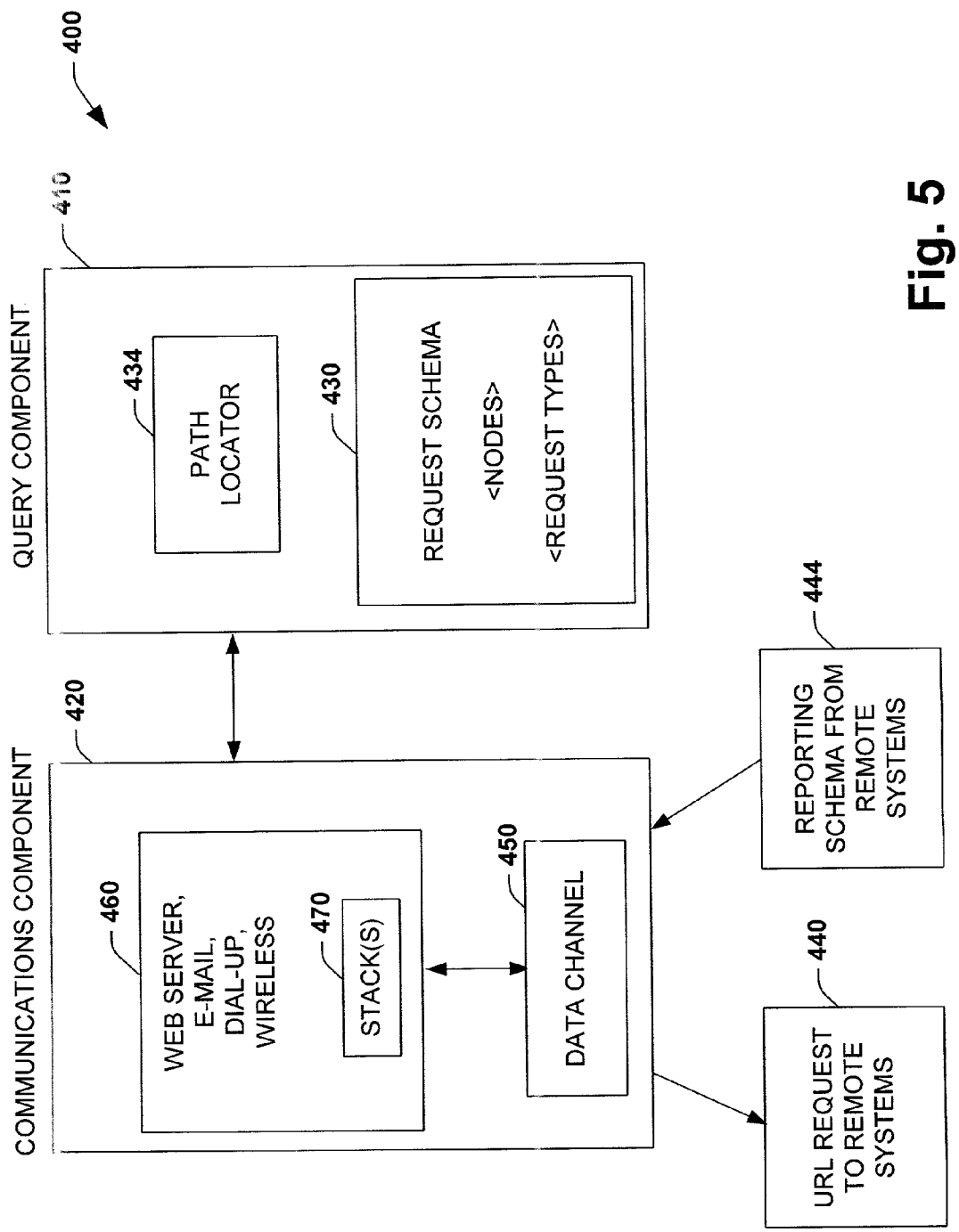
FIG. 5 is a schematic block diagram illustrating a communications component and schema interaction in accordance with an aspect of the present invention.

Referring to FIG. 5, a system 400 illustrates a query component 410 and remote communications in accordance with an aspect of the present invention. The query component 410 (can be included in aggregation component) interacts with a communications component 430 to transmit URL requests and receive URL reports from one or more remote systems (not shown). In addition, the query component 410 can configure a request schema 430 having one or more XML elements (defined by starting and ending tags with </> symbols), arranged in substantially any order) that relate to one or more remote system nodes and associated request type information. Although not shown, the XML elements and associated tags can also include attribute information if desired, wherein an attribute is a name-value pair associated with an element start tag (e.g., <request type="Multicast">, <request type="Broadcast">).

A path locator 434 can be provided to indicate one or more node addresses and/or connection types/devices within the schema 430. The communications component 420 employs the path information in the schema 430 to retrieve URL or other network information from the remote systems via a request at 440. It is to be appreciated that a single schema 430 or request can be broadcast to multiple nodes in performance of a query, or individual schemas can be sent to query a single node, if desired, wherein one or more remote system reports can be received at 444. The remote reports 444 can also be in the form of XML schemas having path information describing where the report 444 originated from and including associated network information relating to a respective node. It is noted that the responses 444 can include XML data and/or combinations of other data such as having an attached binary file that follows the response 444. For example, an element in the response 444 can specify whether the queried data is included in the XML schema or is included as an attachment thereto. As an example, coded information such as an executable may be transmitted in binary. Thus, an element in the response schema can indicate that one or more attached binaries follow the reports at 444. It is also noted that the reports at 444 can be received in an unsolicited manner, wherein no associated previous request 440 was sent to solicit the unsolicited report(s) received from remote systems.

Figure 6:
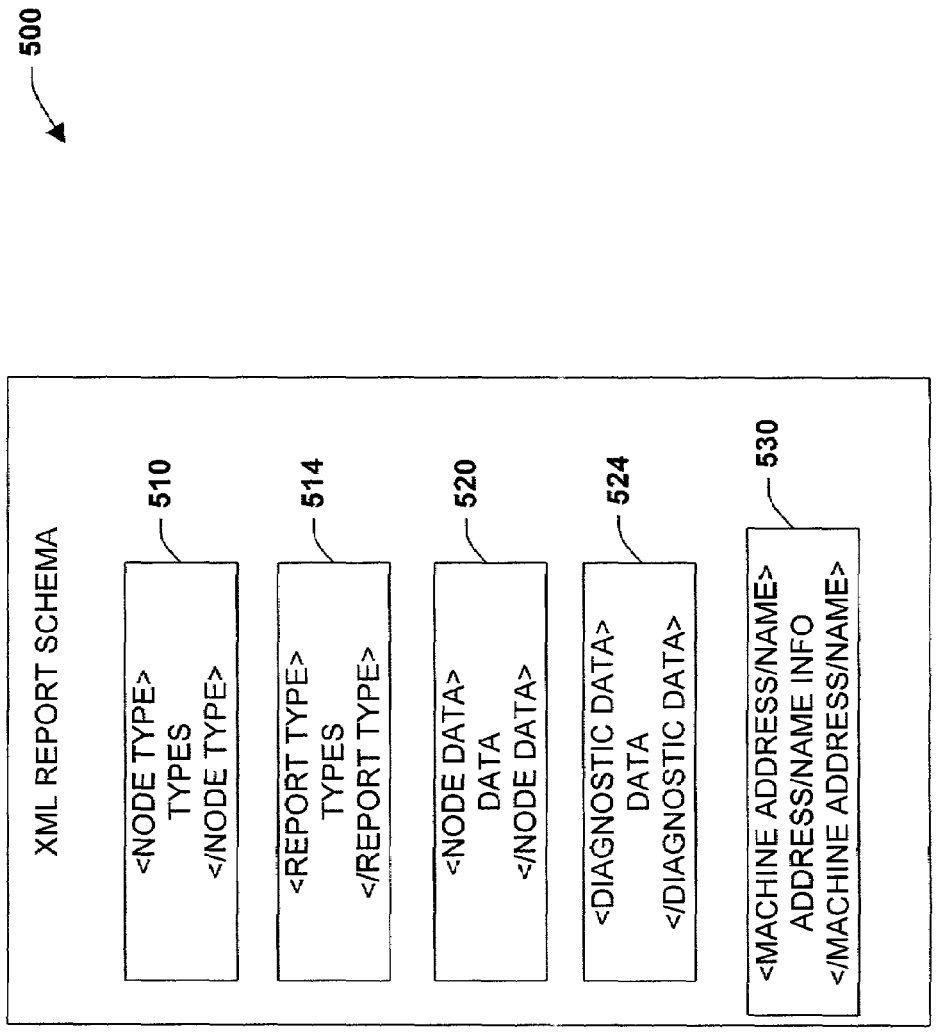
FIG. 6 is a diagram illustrating a reporting schema in accordance with an aspect of the present invention.

Referring now to FIG. 6, a diagram 500 illustrates a report schema in accordance with an aspect of the present invention. The report schema 500 includes one or more XML elements 510 through 530 (defined by starting and ending tags with (</> symbols), arranged in substantially any order) that relate to one or more addresses and provide information to facilitate namespace management of a controller system. Although not show, the XML elements and associated tags can also include attribute information if desired, wherein an attribute is a name-value pair associated with an element start tag (e.g., <node type>"controller">).

At 510, a node type element is provided. This can include a plurality of types such as PLC, communications card, I/O module, and so forth. At 514, a report type element indicates whether there is an address being reported from a remote device or whether an address or name is being requested for the remote device. At 520, a node data element is provided. This can include various data types and include substantially any data associated with a remote network node. At 524, diagnostic data can be provided that relates to information associated with node status. At 530, machine address and/or name information can be provided to indicate an address or URL location for a node. Based upon the data received in the report schema 500, the aggregation component can then accumulate URL and other data to manage a topology of associated devices.

Figure 7:
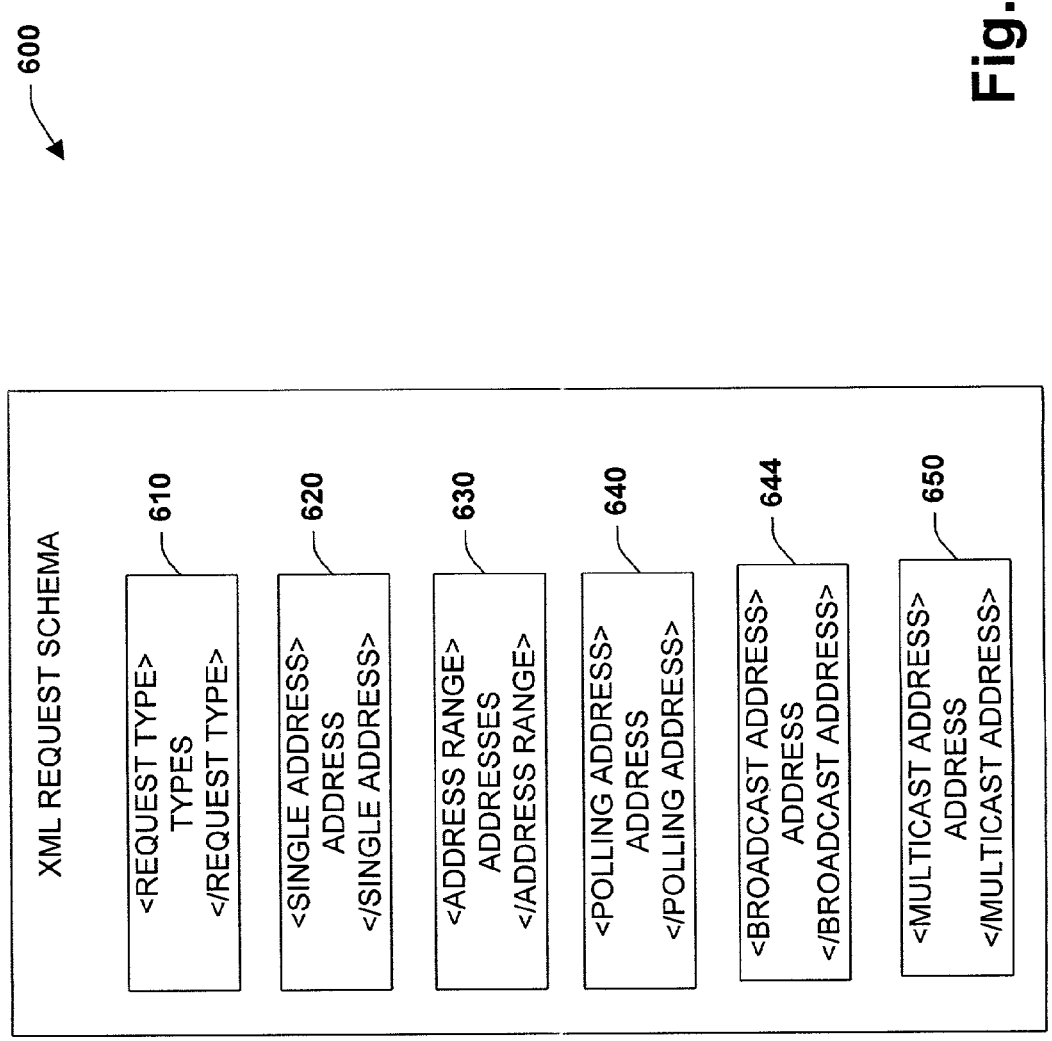
FIG. 7 is a diagram illustrating a request scheme in accordance with an aspect of the present invention.

FIG. 7 is a diagram illustrating a request scheme 600 in accordance with an aspect of the present invention. The request schema 600 can be generated and sent to remote systems as a remote network request to acquire network device or URL information as described above. The request schema 600 can include a request type element at 610. Possible request types can include a single address in which to query, address range for a series of addresses to be polled or broadcast to, a polling address, a broadcast address, and a multicast address. Elements 620 through 650 specify actual addresses and may or may not be included without a corresponding request type specifying that a single address 620, an address range 630, a polling address 640, a broadcast address 644, and a multicast address 650 has been specified.

Figure 8:
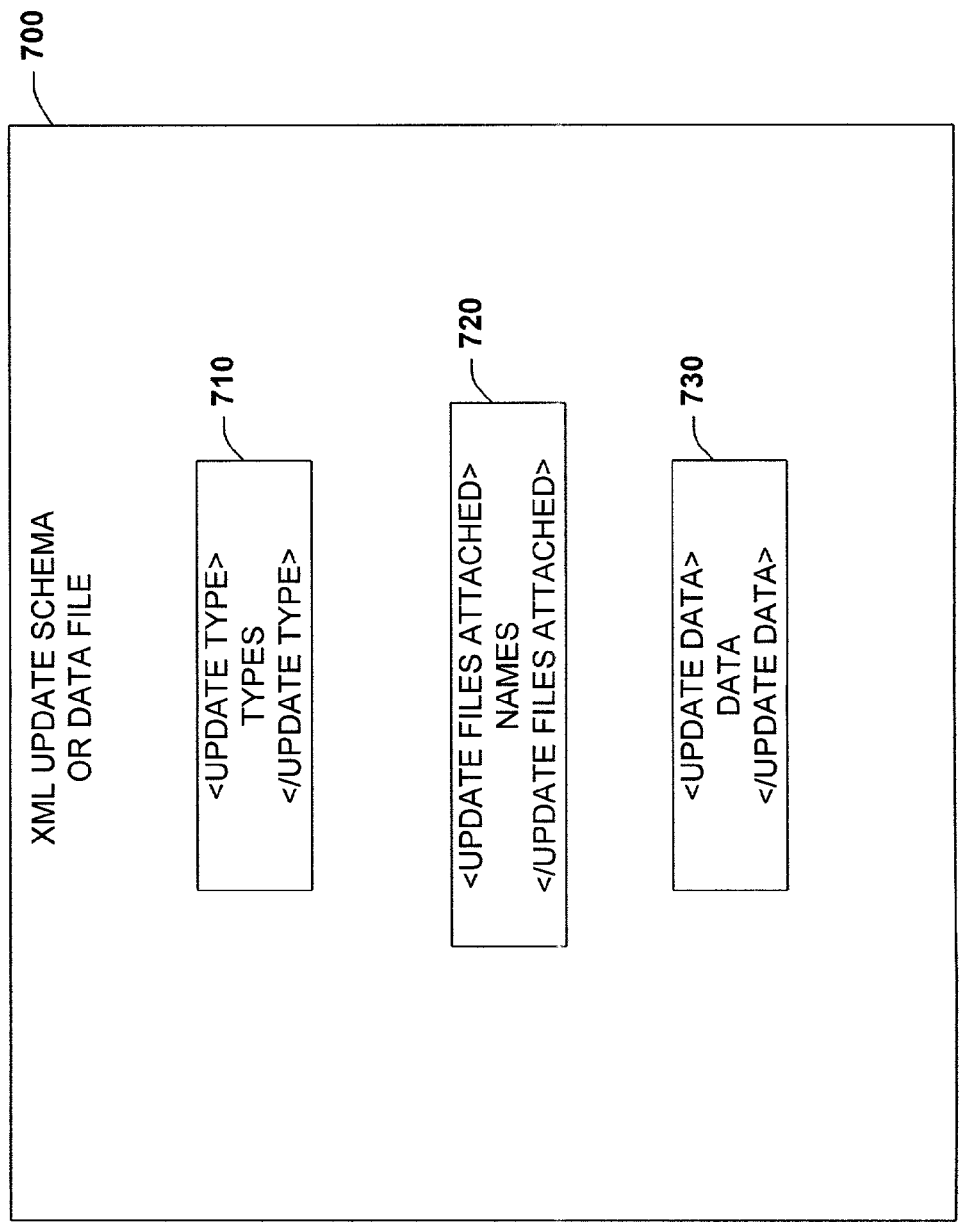
FIG. 8 is a diagram illustrating an update schema in accordance with an aspect of the present invention.

Referring to FIG. 8, a diagram 700 illustrates an update schema in accordance with an aspect of the present invention. This type schema 700 can be employed in accordance with automated procedures described above. For example, after URL or node address information has been accumulated via the report or request schemas above, an automated procedure can poll the accumulated addresses, determine current revision information, and launch upgrade procedures to the node such as sending updated data, documentation, and/or firmware to the node. At 710, an update type element specifies a proposed update for a controller or associated module at a respective node address. For example, this can include a firmware update, embedded document update, controller program update, and so forth. At 720, an element specifies whether the proposed update specified at 710 is included in the XML schema 700 or is included as an attachment to the schema. For example, firmware revisions are generally transmitted in binary. Thus, the element 720 can indicate that one or more attached binaries follow the XML update schema 700. In another example, embedded document type updates are generally specified in ASCII. Thus, an update data element 730 is provided that includes the updated document information within the schema 700. It is noted that the schema 700 can support having actual updated information stored therein and support having one or more attachments (e.g., non-XML data transmitted subsequently to the update schema), if necessary.

Figure 9:
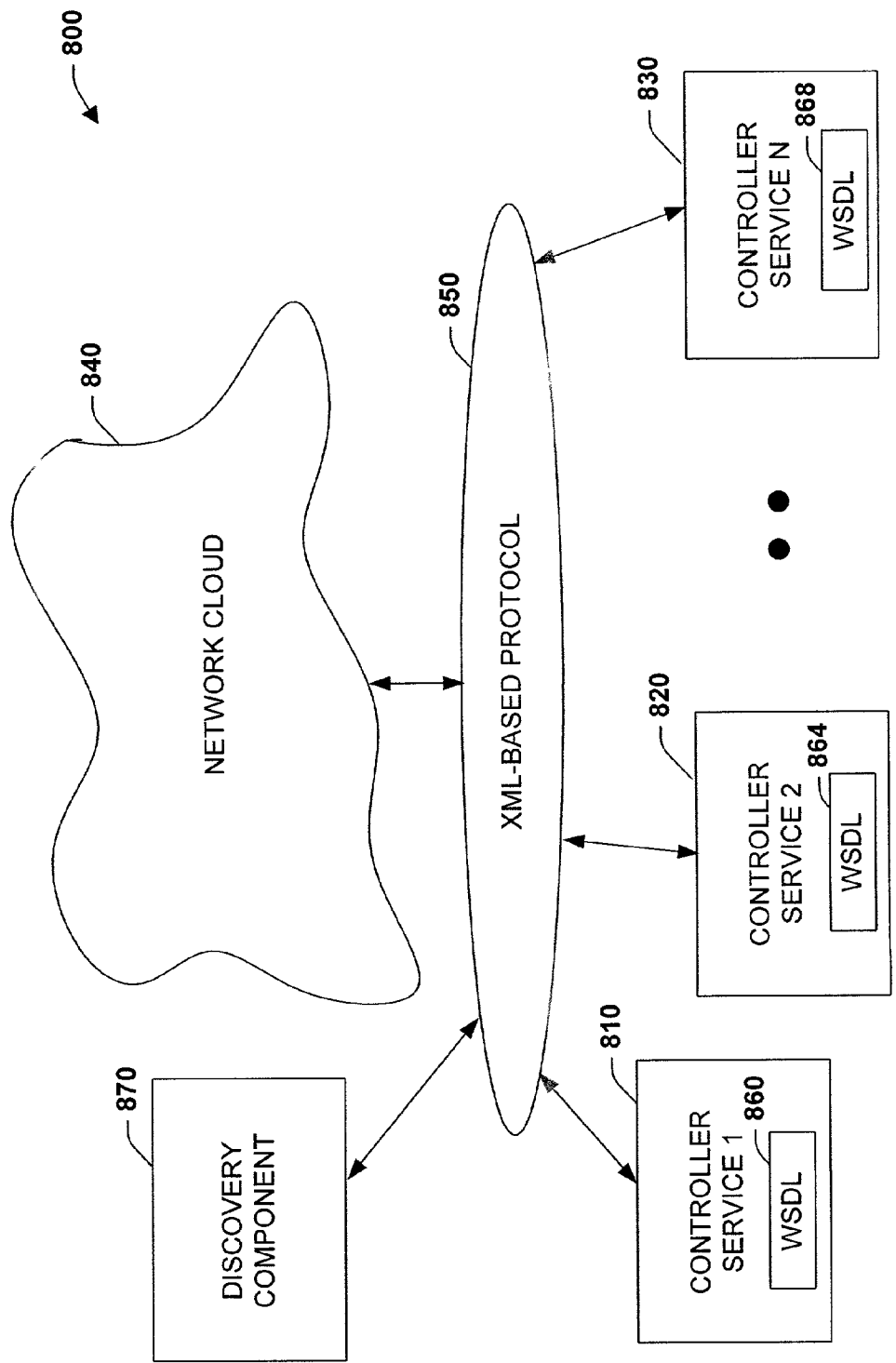
FIG. 9 is a block diagram illustrating a web interface and protocols in accordance with an aspect of the present invention.

Referring now to FIG. 9, a system 800 illustrates web service interface and protocols in accordance with an aspect of the present invention. A plurality of controller services 810 through 830 interact with a network cloud 840 via an XML-based protocol 850. The protocol 850 should be an open standard defined for use on a public communications systems such as the Internet. In one aspect, a Simple Object Access Protocol (SOAP) 850 can be employed as a communications protocol for XML Web services. SOAP is an open specification that defines an XML format for messages between services. The specification can include describing how to represent program data as XML and how to utilize SOAP to perform Remote Procedure Calls. These optional parts of the specification are employed to implement Remote Procedure Call (RPC)-style applications, wherein a SOAP message containing a callable function, and the parameters to pass to the function, is sent from a client such as a control system, and the server returns a message with the results of the executed function. Most current implementations of SOAP support RPC applications since programmers who are familiar to COM or CORBA applications understand the RPC style.

SOAP also supports document style applications whereby the SOAP message is provided as a wrapper around an XML document. Document-style SOAP applications are very flexible, wherein a control system XML Web service can take advantage of this flexibility to build controller services that may be difficult to implement with RPC.

Other parts of the SOAP specification define what an HTTP message that contains a SOAP message may appear as. HTTP binding can be important because HTTP is supported by almost all current operating systems. HTTP binding is optional, but almost all SOAP implementations support it as one possible standardized protocol for SOAP. For this reason, there's a common misconception that SOAP requires HTTP. Some implementations support MSMQ, MQ Series, SMTP, or TCP/IP transports, but almost all current XML Web services employ HTTP because it is ubiquitous. Since HTTP is a core protocol of the Web, most organizations have a network infrastructure that supports HTTP. Security, monitoring, and load-balancing infrastructure for HTTP are also readily available. It is to be appreciated that commercially available tools can be employed to construct SOAP messages directly. This can include a SOAP toolkit to create and parse SOAP messages. These toolkits generally translate function calls from a computer language to a SOAP message. For example, a Microsoft SOAP Toolkit 2.0 translates COM function calls to SOAP and an Apache Toolkit translates JAVA function calls to SOAP.

The controller services 810 through 830 can also employ an open interface standard such as a Web Service Description Language (WSDL) illustrated at 860 through 868 in order to provide interactions with the controller services. In general, a WSDL file or interface is an XML document that describes a set of SOAP messages and how the messages are exchanged. In other words, WSDL 860-868 is to SOAP what Interface Description Language (IDL) is to CORBA or COM. Since WSDL is in XML format, it is readable and editable but in most cases, it is generated and consumed by software. WSDL specifies what a request message contains and how the response message will be formatted in unambiguous notation and is utilized in accordance with the schemas previously described. As an example, an I/O service can specify how inputs are to be requested from the service and how outputs can be sent to the service in the form of a response. In another aspect, inputs can be requested from an input service, wherein the response is a confirmation that the inputs were received. Outputs can be sent to an output service in the form of a request, wherein the response from the service is that the outputs were received. Other services can include reporting and request services to supply, generate, and/or accumulate URL and/or node address information.

The notation that a WSDL file utilizes to describe message formats is based on an XML Schema standard which implies it is both programming-language neutral and standards-based which makes it suitable for describing XML Web services interfaces that are accessible from a wide variety of platforms and programming languages. In addition to describing message contents, WSDL defines where the service is available and what communications protocol is employed to communicate to the service. This implies that a given WSDL file defines substantially all matters required to write a program to work with an XML Web service. As noted above, there are several tools available to read a WSDL file and generate code to communicate with an XML Web service. For example, some of the most capable of these tools are in Microsoft Visual Studio® .NET. It is noted that further reference to the WSDL specification can be found at http://www.w3.org/TR/wsdl, if desired.

The system 800 can also include a discovery component 870, wherein the controller services 810-830 can be published and determined. In one aspect, a Universal Discovery Description and Integration (UDDI) can be provided at 170 that serves as a type of logical "phone" directory (e.g., "yellow pages,""white pages,""green pages") describing Web services. A UDDI directory entry is an XML file that describes a controller system and the services it offers. There are generally three parts to an entry in the UDDI directory. The "white pages" describe the component offering the service: name, address, and so forth. The "yellow pages" include industrial categories based on standard taxonomies such as the North America Industry Classification System and Standard Industrial Classifications. The "green pages" describe the interface to the service in enough detail for users to write an application to employ the Web service. The manner services are defined is through a UDDI document called a Type Model or tModel. In may cases, the tModel contains a WSDL file that describes a SOAP interface to an XML Web service, but the tModel is generally flexible enough to describe almost any kind of service. The UDDI directory also includes several options to search for the services to build remote applications. For example, searches can be performed for providers of a service in a specified geographic location or for an entity of a specified type. The UDDI directory can then supply information, contacts, links, and technical data to enable determinations of which services to employ in a control process. As noted above, the discovery component 870 can include a DNS and/or a namespace server What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An industrial control system, comprising:
   an aggregator that collects network addresses and namespace information from a subset of industrial controllers and launches an automated activity in accordance with the collected network addresses and namespace information, the automated activity includes determination of status of the industrial control system; and
   a component associated with the subset of industrial controllers that reports a network address of at least one of the subset of industrial controllers to the aggregator, determines a geographic location of the at least one of the subset of industrial controllers, and generates a universal resource locator (URL) for the at least one of the subset of industrial controllers based at least in part on a unique base URL stored on the at least one of the subset of industrial controllers, the URL further comprises information related to the geographic location.

2. The system of claim 1, the component is at least one of a responder or an address generator associated with the at least one of the subset of industrial controllers.

3. The system of claim 1, the component is a discovery component operative within a networked industrial control system.

4. The system of claim 3, the discovery component is at least one of a domain name service, a namespace server, a web site, a controller, a network device, a or a Universal Description Discovery and Integration (UDDI) component.

5. The system of claim 1, the network addresses are at least one of a Universal Resource Locator (URL), Uniform Resource Identifier (URI), an Ethernet address, or a TCP/IP address.

6. The system of claim 1, further comprising a request mode component that supports at least one of a polling mode, a broadcast mode, or a request/reply mode to retrieve the network addresses from the subset of industrial controllers.

7. The system of claim 6, the broadcast mode further comprising a multicast mode to cause the subset of industrial controllers to report the network addresses.

8. The system of claim 7, the polling mode transmits network request to a predetermined range of network addresses to retrieve the network addresses from the subset of industrial controllers.

9. The system of claim 7, the polling mode transmits network request to a predetermined list of supervisory network devices to retrieve the network addresses from the subset of industrial controllers.

10. The system of claim 9, the supervisory network devices including at least one of a gateway, a Local Area Network (LAN) server, or a router.

11. The system of claim 2, the responder reports to at least one of a discovery component or the aggregator in order to report the network addresses or URL.

12. The system of claim 11, the responder employs a reporting schema to report the network address, the reporting schema including at least one of a node type, a report type, node data, diagnostic data, or network address information.

13. The system of claim 12, the node type includes at least one of a PLC, a network card, or an I/O module.

14. The system of claim 12, the report type includes at least one of an address to report or a network address request.

15. The system of claim 12, the node data includes at least one of revision information or status information of at least one of the subset of industrial controllers.

16. The system of claim 1, further comprising a request schema to retrieve the network addresses, the request schema specifying at least one of a request type, a single network address, a range of network addresses, a polling address, a broadcast address or a multicast address.

17. The system of claim 1, at least one of the aggregator or the component configured as a web service.

18. The system of claim 17, further comprising at least one of a Web Service Description Language (WSDL) interface or a Simple Object Access Protocol (SOAP) to interact with the web service.

19. The system of claim 1, further comprising a communication component to communicate the network addresses, the communication component including at least one communications stack to process at least one communications protocol.

20. The system of claim 19, the at least one protocol including at least one of a TCP, TCP/IP, EthernetIP, FOUNDATION Fieldbus HSE, Modbus, or IDA protocols.

21. The system of claim 1, the automated activity further comprises determining current revisions and performing upgrades, the upgrades including at least one of a firmware upgrade, a documentation upgrade, a file upgrade or a data upgrade.

22. The system of claim 21, further comprising an upgrade schema to indicate upgrade.

23. The system of claim 2, the address generator at least one of generates a unique address, generates a temporary address, or performs a registration procedure with the aggregation component.

24. The system of claim 23, the address generator reports network information to a discovery component.

25. A method to aggregate namespace data in an industrial control system, comprising:
at least one of a polling, broadcasting or multicasting for network addresses of industrial controllers, the network addresses specifying a namespace and geographic location of a respective industrial controller;
reporting the network addresses of the industrial controllers, the reporting including at least one of:
responding to the at least one of polling, broadcasting, and multicasting for network addresses;
reporting at least one of a permanent address and a temporary address;
reporting a location-based address; or performing a registration procedure to receive a different network address; and
automatically launching activities to the industrial controllers based on the network address.

26. The method of claim 25 further comprising transmitting at least one of a request or a reply schema to communicate the network addresses.

27. A system to aggregate namespace data in an industrial control system, comprising:
means for at least one polling, broadcasting or multicasting for URL addresses of industrial controllers, the network addresses specifying a namespace and geographic location of a respective industrial controller;
means for reporting the URL addresses of the industrial controllers, the reporting including at least one of:
means for responding to the polling, broadcasting, and multicasting of URL addresses;
means for reporting at least one of a permanent address and a temporary address;
means for determining a location-based address; or
means for performing a registration procedure to receive a different URL address; and
means for automatically launching activities to the industrial controllers based on the network address.

* * * * *

UNITED STATES PATENT AND TRADEMARK OFFICE
CERTIFICATE OF CORRECTION

PATENT NO. : 7,606,890 B1  Page 1 of 1
APPLICATION NO. : 10/162314
DATED : October 20, 2009
INVENTOR(S) : Baier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 857 days.

Signed and Sealed this

Twelfth Day of October, 2010

David J. Kappos
*Director of the United States Patent and Trademark Office*